United States Patent [19]

Smith

[11] 3,797,744

[45] Mar. 19, 1974

[54] PORTABLE CLEANING AND SANITIZING SYSTEM

[76] Inventor: Ward Harris Smith, 3142 S. Josephine, Denver, Colo. 80210

[22] Filed: Nov. 20, 1972

[21] Appl. No.: 307,856

[52] U.S. Cl..................... 239/172, 118/7, 134/102, 134/113, 137/209, 137/344, 222/144.5, 239/305
[51] Int. Cl.......................................... B08b 13/00
[58] Field of Search............ 239/66, 172, 175, 304, 239/305, 310, 312, 335; 222/136, 144.5; 134/99–102, 113; 118/7, 73; 137/209, 344, 351, 354

[56] References Cited
UNITED STATES PATENTS

| | | | |
|---|---|---|---|
| 1,820,316 | 8/1931 | Miller | 239/335 X |
| 2,571,575 | 10/1951 | Holmes | 239/304 X |
| 2,987,259 | 6/1961 | Lindquist | 239/304 X |
| 3,438,583 | 4/1969 | Lawrence III | 239/305 |
| 3,612,356 | 10/1971 | McVey | 239/172 X |

Primary Examiner—M. Henson Wood, Jr.
Assistant Examiner—Andres Kashnikow
Attorney, Agent, or Firm—Richard D. Law

[57] ABSTRACT

A wheeled frame, supporting a series of chemical tanks connected to the manifold, which includes a high pressure pump for a high pressure, low volume, or low pressure, high volume, cleaning and sanitizing capability. It has a metered and controlled selected chemical injection produced by a high pressure proportioning pump downstream of the high pressure water pump which pumps chemicals from the chemical tanks into the pressurized fluid stream. An additional capability is a metered and controlled oil injection into a high pressure air stream, which also has a drying capacity when oil is not metered into the system. The unit requires connections for electrical, power, and air which are locally available in the areas to be cleaned. Cleaning and sanitizing may be readily achieved by use of a detergent foam, then a high or low pressure chemical wash and followed by a sterilizing solution, and then by a clear-water low pressure rinse, all of which is followed by an oiling of clean equipment. Quick disconnect service terminals provide fast and easy set-up and take-down of the unit.

10 Claims, 5 Drawing Figures

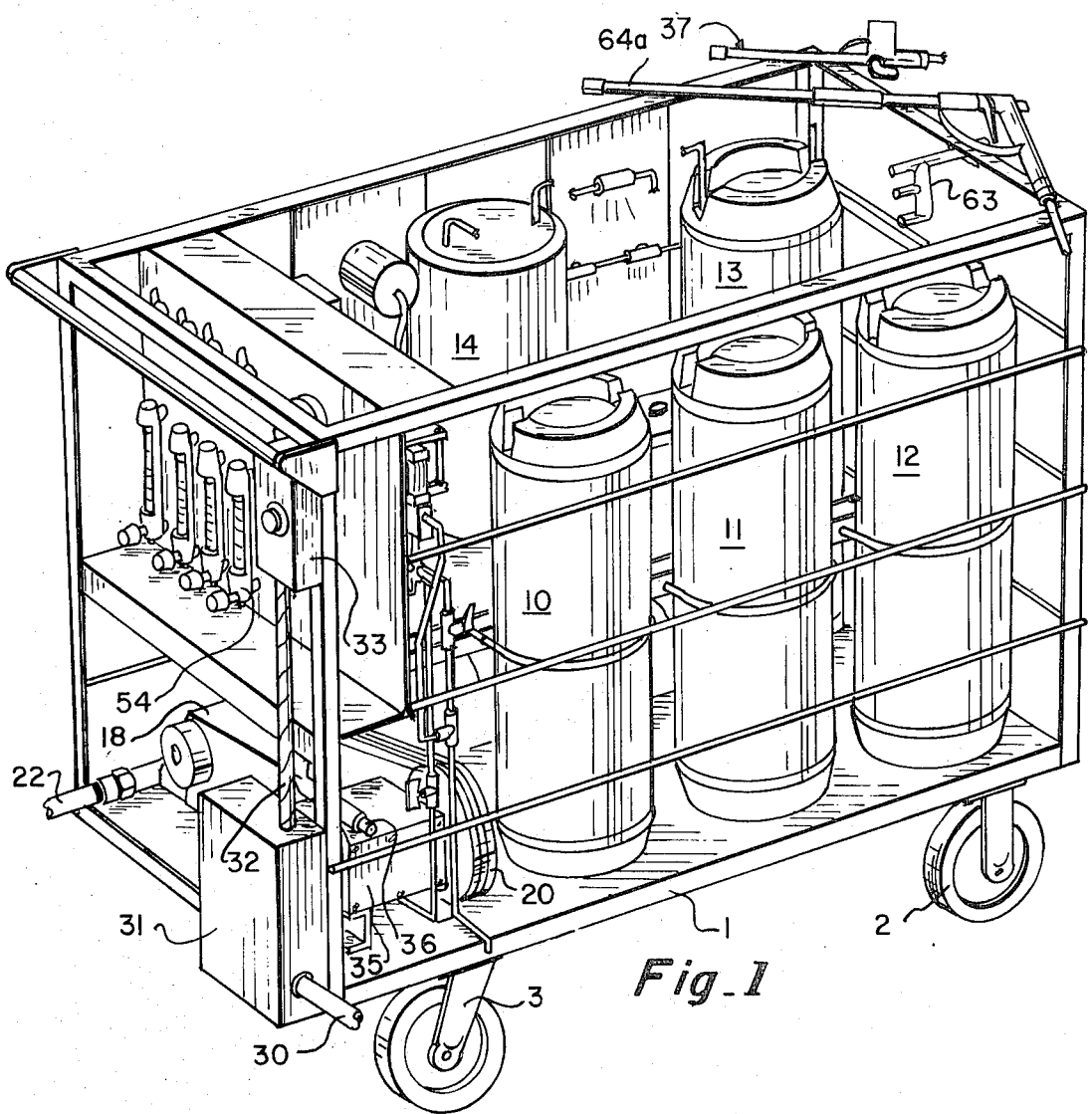
Fig_1
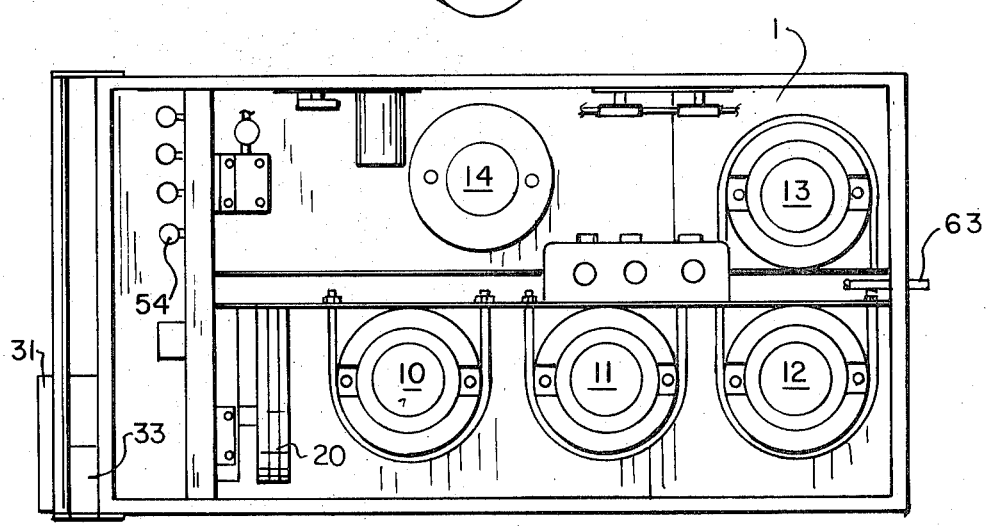
Fig_2

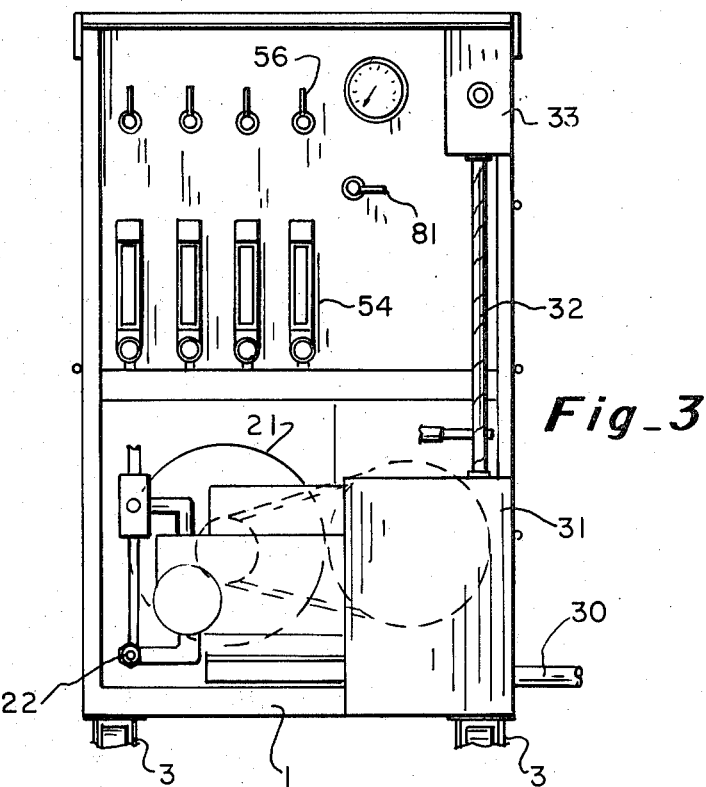
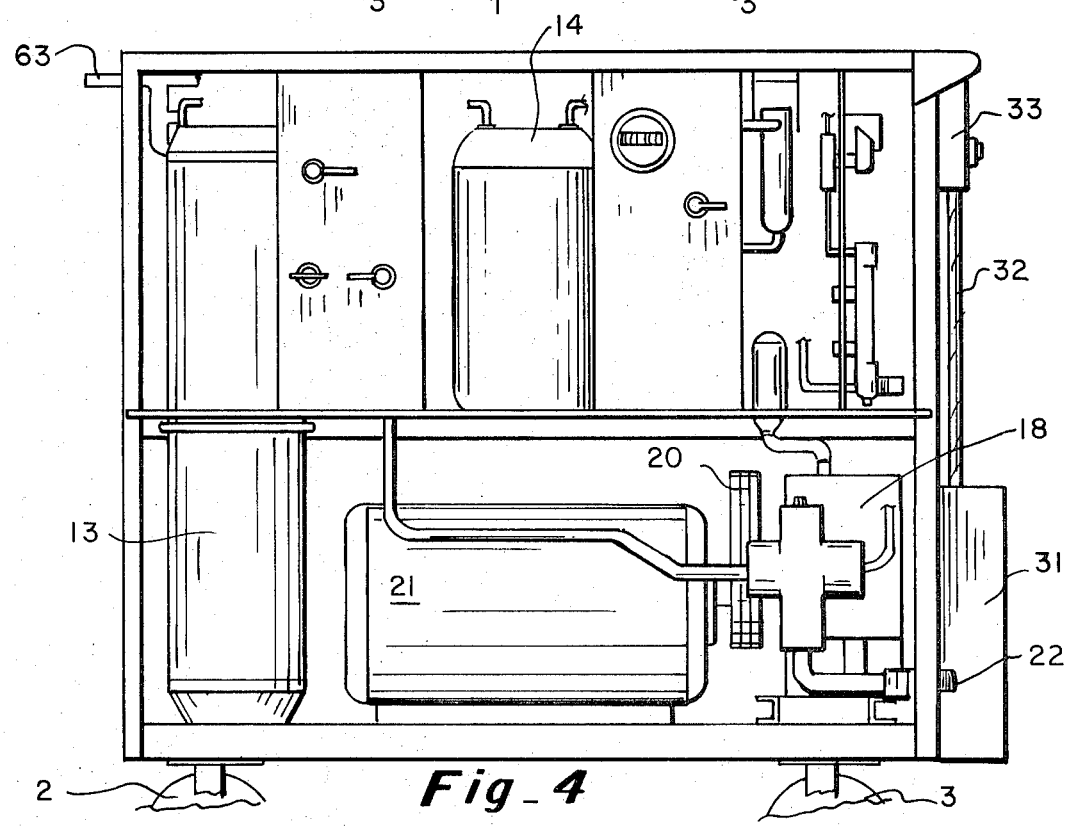
Fig_3
Fig_4

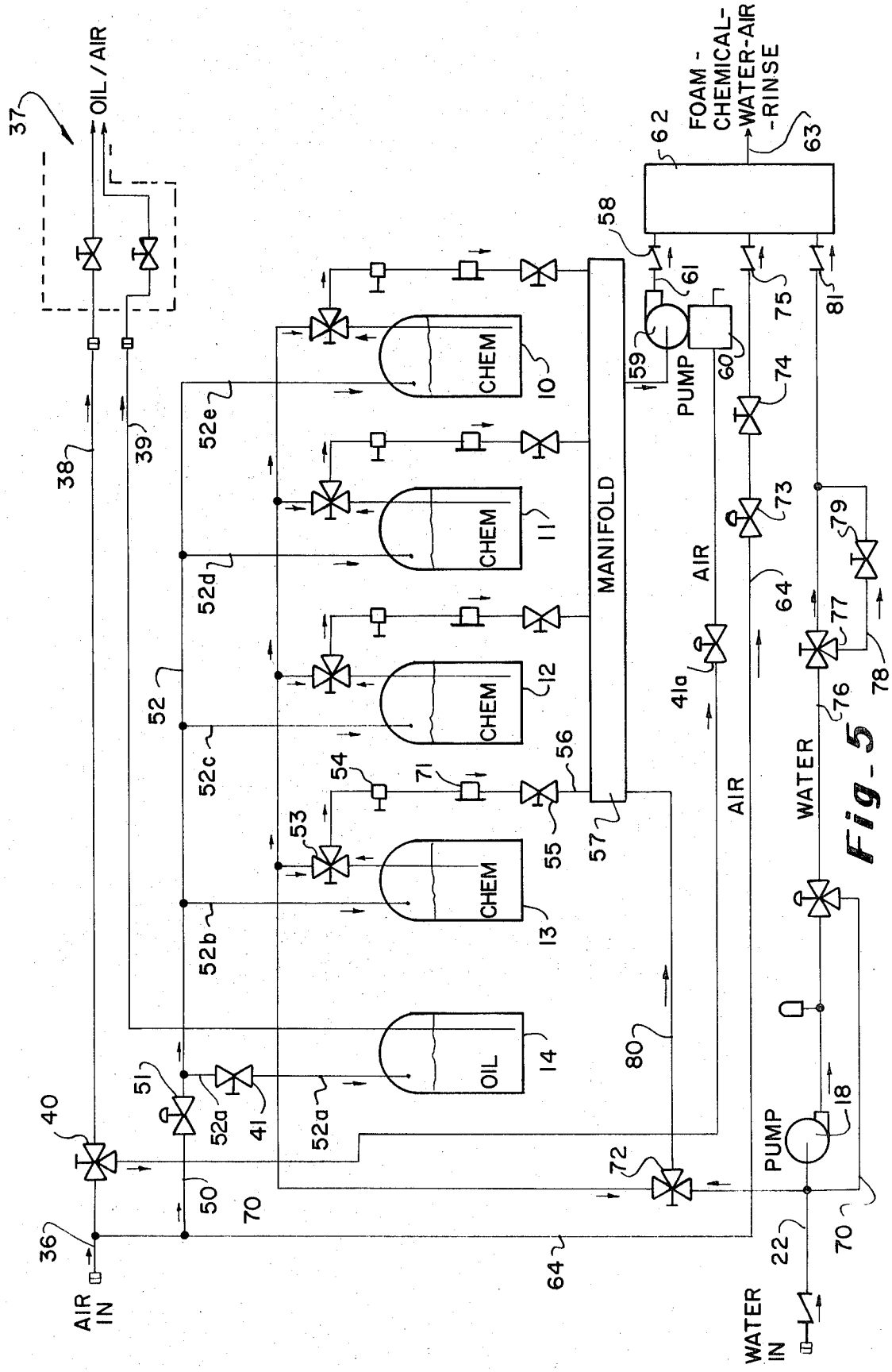

PORTABLE CLEANING AND SANITIZING SYSTEM

Commercial food processors and other industrial plants are prone to accumulating dirt with accompanying unsanitary conditions, and considerable time, money and effort are needed to maintain clean and sanitary premises. Commercial packing plants have particular problems as fats and greases from slaughtered animals stick to walls, floors, ceilings, equipment and machinery. This build-up hastens accumulation of dirt and grime and provides an excellent breeding place for germs, etc. When cleaning is not frequent and systematic, the dirt buildup is excessive and clean up is made more difficult.

Legislation and extensive policing of the field have required an unprecedented cleanup of food processing plants requiring a continuous maintenance and cleaning operation. Older buildings are particularly hard hit in this matter as they were not built with cleaning and sanitation in mind. Prior to the present invention, the clean up of packing plants was an onerous chore requiring hand labor in physically scrubbing walls, beams, ceilings and equipment. This, of course, causes a shutdown of operating units with a resultant loss of productive time.

Included among the objects and advantages of the present invention is a portable, essentially complete cleaning and sanitizing unit providing pressurized streams of fluid.

Another object of the invention is to provide a portable essentially complete cleaning and sanitizing unit providing a plurality of cleaning and sanitizing chemicals for admixing with high and low pressure streams of water.

Yet another object of the invention is to provide a portable as well as essentially complete cleaning and sanitizing unit arranged to dispense foams and high and low pressure fluid streams.

Still another object of the invention is to provide portable, essentially complete cleaning and sterilizing units arranged to accurately control the concentration of chemical solutions issued from the unit.

Another object of the invention is to provide a small, highly portable, essentially complete unit for producing pressurized streams of chemical fluids.

An additional object of the invention is to provide a portable, essentially complete cleaning and sanitizing unit arranged for utilizing existing service outlets or those requiring minimal additions and changes.

A further object of the invention is to provide a portable, essentially complete cleaning and sanitation unit issuing high or low pressure streams of fluid arranged to permit a single worker to quickly and effectively clean and sanitize food processing work areas without manual scrubbing and without leaving the immediate vicinity of the unit.

These and other objects and advantages of the invention may be readily ascertained by referring to the following description and appended illustrations in which:

FIG. 1 is a perspective view of a portable cleaning and sanitizing unit according to the invention illustrating the major elements positioned on a wheeled cart;

FIG. 2 is a top plan view of the device of FIG. 1;

FIG. 3 is an end elevation of the device of FIG. 1 illustrating the control panel means including means for metering chemicals into a stream of water;

FIG. 4 is a side elevational view of the device of FIG. 1; and

FIG. 5 is a generally schematic flow and piping diagram of the plumbing of the unit of FIG. 1 for producing cleaning and sanitizing fluids.

In the device selected for illustration in FIGS. 1 through 4, a cart platform 1 is provided with a pair of spaced, forward wheels 2 and a pair of spaced rear wheels 3. The wheels or casters at the forward end may be non-castering and the wheels at the opposite end of the cart may be castering, or all the wheels may be castering wheels depending on the necessity for maneuvering the cart. Removably mounted upright on the cart are tanks, 10, 11, 12 and 13 connected to a manifold so that chemicals in the tanks may be placed into a stream of water issuing from the unit. An oil tank 14 is also mounted on the unit and it is arranged to issue a mist of oil in air for spraying on machinery and metal objects which have been thoroughly cleaned so as to prevent oxidation or rusting of the cleaned metal surfaces. A high pressure pump 18 rotated by means of belts 20 driven by an electric motor 21 receives water from a hose or pipe 22 from a utility outlet near the place where the unit is to be used (not shown). The water may be hot or cold depending upon the plans and upon the needs of the cleaning process. Electric service for the unit enters through a power line 30, through a breaker switchbox 31, and through a distribution power line 32 to a switch 33 for operating the motor 21 and other electrical equipment.

Air and/or a mist of oil and air is issued through a spray gun, shown in general by numeral 37, attached to a pair of hoses 38 and 39, shown in FIG. 5. Oil is injected from tank 14 by compressed air entering lines 36, 50 and 52 a, FIG. 5. Some air from line 36 passes through a regulating valve 51 and a shut off valve 41 and goes to line 52a which pressurizes the tank 14 for forcing oil into the spray gun 37. The air flowing into the line 38 is controlled by a three-way valve 40 and if allowed to flow, goes directly to the oil gun. By allowing this air to flow with valve 41 closed the machine can be used to dry equipment.

Each chemical tank is pressurized to introduce liquid through a flow meter into a manifold through a chemical pump driven by an air motor and subsequently through a spray nozzle. Compressed air in line 36 passes through a line 50, a regulating valve 51, and into a manifold 52 with spur lines 52 b, 52 c, 52 d, and 52 e, going to each of the tanks 13, 12, 11 and 10 respectively. The outlet from each tank passes through an equivalent set up, and a detailed discussion of tank 13 will suffice for explaining the set up of each of the other tanks. An outlet from the tank 13 passes through a three-way valve 53, a metering valve 54, a flow indicator 71 and a control valve 55. From the control valve 55, fluid passes through line 56 into a manifold 57. From the manifold 57 the chemical passes through a chemical proportioning pump 59 driven by an air motor 60 which is regulated by valve 40. The chemical from the pump 59 passes through a line 61 and a check valve 58, into a manifold 62 having a high pressure hose 63 terminating in a spray nozzle 64a, shown in FIG. 1 lying on top of the unit. To flush the metering valves to prevent chemical deposits, a water line 70 extends from line 22 through a three-way valve 72 to a three-way valve 53. To flush the top manifold of chemical and to provide dilution of the chemical prior to its insertion into the flexible hose 63, a water line 80 extends from line 70 through the three way valve 73 to the manifold 57.

Air may be introduced into the manifold 62 through a line 64 from the air line 36 passing through a control valve 73, a shut off valve 74, and a check valve 75 prior to introduction into the manifold 62. Water may be introduced into the manifold through a line 76 passing through a three-way valve 77, or through a by-pass 78 and a needle valve 79 therein. Both go to check valve 81. The water may be introduced into the manifold 62 as pressurized water or as merely tap pressure water by disengaging the motor which drives the pump.

For use, the cart is pushed to the point of use and the services are connected. The water inlet is connected to a controlled mixture of hot and cold water; the electrical inlet is connected to a 220 AC outlet; and the air inlet is connected by means of a hose to a compressed air line. Preferably, the compressed air is from 40 to 90 pounds pressure and the water supply should provide at least 10 to 12 gallons per minute. Also, the water supply should preferably be in the range of 120° to 160° F., although lower water temperatures may be used due to the high pressure. The pump for the water issues about 4 gallons per minute of 1,200 pounds pressure water which issues through the spray nozzle 64a. The cart may be enclosed by covers which extend over the top and around the side so that the unit may be used in a room which is being completely cleaned without over-wetting the various elements on the cart. A high pressure hose is connected to the line 63 and spray nozzle 64A is connected to that line.

Initially, the room may be sprayed with a foam, which is a detergent from one or more of the tanks and injected into the manifold through the chemical pump. Low pressure water from the by-pass line 78 is injected into manifold 62. Air is, also, injected into the manifold 62 along with the water and detergent to produce the foam. This foam, under pressure, is issued from line 63. The detergent may be an industrial detergent used for cleaning industrial plants and the foam can be readily made as wet or as dry as desired by controlling the needle valve 79 with the three-way valve 77 arranged to pass water through the line 78. After all the surfaces of the room and equipment therein are covered with the foam, either a rinse or a cleaning solution may then be applied at high or low pressure, depending upon desired volume, through the spray nozzle. The chemical for cleaning, which may be highly alkaline or highly acid, is passed through the manifold through the proportioning pump into the manifold 62. High or low pressure water for rinsing or cleaning is run from the water pump directly to the manifold and out through the spray nozzle 64a, along with the chemical which mixes in the manifold.

For foaming or cleaning, air pressure forces the chemical from the tanks into manifold 57 for subsequent injection by means of the pump into the manifold 62. The foam initially soaks up dirt and the like. Using the high or low pressure alkaline or acid wash, the whole room is then washed down, removing the unrinsed foam. The walls and the equipment are generally cleaned with a high pressure alkaline solution, and/or then recleaned with an acid cleaner and brightener. Such treatment is satisfactory for most of the equipment. Following this treatment, the chemical tanks are closed and the room and equipment is rinsed with low pressure, high volume, clear tap water.

The high and low pressure cleaning is very effective for cleaning rooms by a single operator, even rooms with high ceilings of 14 or 15 feet or more. The ceilings and walls may be readily cleaned without hand brushing and by the operator standing on the floor. The chemical cleaners are useful for cleaning walls and equipment which have been coated with fats and grease and dirt. Following the rinsing of the walls and equipment, the room and equipment may be sanitized. A chemical sanitizer is injected through the manifold 57, the chemical pump 59 and the manifold 62 along with water necessary for spraying the sanitizing solution. Following the sanitizing, any equipment which has been scoured leaving bright metal surfaces may be oiled by the use of the oil mist through the pump and the spray gun 37.

By making the portable cart about 26.5 × 48 × 41.5 inches and of stainless steel throughout, its fully loaded weight runs to about 600 pounds. On large casters it is very easily moved by an operator. Further, the tanks are of sufficient size to clean large areas without refilling so that the down time of the unit is minimal.

I claim:

1. A portable cleaning and sanitizing system comprising a wheeled frame having connections for water, electricity and air services; a plurality of liquid holding, pressurizable tanks mounted on said frame, and each said tank arranged with a liquid outlet; means for selectively forcing liquid through said outlets; flow control and measuring means for each outlet; first manifold means; each said flow control and measuring means communicating with said manifold means; water inlet means communicating with said first manifold means; high pressure pump means connected to the outlet of said first manifold means for pressurizing fluid from said tanks; second manifold means having inlet means and outlet means; means connecting said high pressure pump means and said second manifold; high pressure water pump means including by-pass means connected to said water connection and connected with said second manifold for selectively injecting high and low pressure into said second manifold; means connecting said air service to said second manifold; and nozzle means connected with said outlet of said second manifold for issuing various mixtures of liquids from said tanks, water and air.

2. A portable cleaning and sanitizing system according to claim 1 wherein air under pressure from said air service pressurizes said liquid holding tanks forcing said liquid from said tanks.

3. A portable cleaning and sanitizing system according to claim 1 wherein said liquid holding tanks are removable.

4. A portable cleaning and sanitizing system according to claim 1 wherein said high pressure water pump means is mounted on said wheeled frame.

5. A portable cleaning and sanitizing system according to claim 1 being further characterized by an oil containing tank, a line from said oil containing tank, and a nozzle on said line for issuing oil therefrom.

6. A portable cleaning and sanitizing system according to claim 1 wherein said water inlet means for said first manifold means by-passes said high pressure pump means.

7. A portable cleaning and sanitizing system according to claim 1 wherein said outlets on said tanks are independent of each other.

8. A portable cleaning and sanitizing system according to claim 1 wherein said various mixtures issuing from said nozzle means is at predetermined pressures.

9. A portable cleaning and sanitizing system according to claim 1 wherein said nozzle means includes a length of flexible hose for movement of said nozzle away from said wheeled frame.

10. A portable cleaning and sanitizing system according to claim 1 wherein said means connecting said high pressure pump means and said second manifold includes a check valve whereby fluid from said high pressure pump means exhausting into said second manifold exceeds the pressure issued by said high pressure water pump means.

* * * * *

UNITED STATES PATENT OFFICE
CERTIFICATE OF CORRECTION

Patent No. 3,797,744  Dated March 19, 1974

Inventor(s) Ward Harris Smith

It is certified that error appears in the above-identified patent and that said Letters Patent are hereby corrected as shown below:

Col. 3, line 5, "73" should be --72--

Signed and sealed this 9th day of July 1974.

(SEAL)
Attest:

McCOY M. GIBSON, JR.
Attesting Officer

C. MARSHALL DANN
Commissioner of Patents